United States Patent
Brant et al.

(10) Patent No.: US 9,021,479 B2
(45) Date of Patent: Apr. 28, 2015

(54) ENFORCING MACHINE DEPLOYMENT ZONING RULES IN AN AUTOMATIC PROVISIONING ENVIRONMENT

(71) Applicant: International Business Machines Corporation, Armonk, NY (US)

(72) Inventors: Charles D. Brant, Raleigh, NC (US); Matthew D. Lavin, Raleigh, NC (US); Joseph Leong, West Lafayette, IN (US); John L. Ryding, III, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 225 days.

(21) Appl. No.: 13/648,347

(22) Filed: Oct. 10, 2012

(65) Prior Publication Data

US 2014/0101655 A1 Apr. 10, 2014

(51) Int. Cl.
| | |
|---|---|
| *G06F 9/455* | (2006.01) |
| *G06F 9/46* | (2006.01) |
| *G06F 15/173* | (2006.01) |
| *G06F 9/445* | (2006.01) |

(52) U.S. Cl.
CPC .............. *G06F 8/61* (2013.01); *G06F 9/45533* (2013.01)

(58) Field of Classification Search
None
See application file for complete search history.

(56) References Cited

U.S. PATENT DOCUMENTS

| | | | |
|---|---|---|---|
| 7,555,551 B1 | 6/2009 | McCorkendale et al. | |
| 2008/0184225 A1* | 7/2008 | Fitzgerald et al. | 718/1 |
| 2009/0125904 A1* | 5/2009 | Nelson | 718/1 |
| 2010/0161922 A1* | 6/2010 | Sharp et al. | 711/162 |
| 2011/0154320 A1 | 6/2011 | Verma | |
| 2011/0214005 A1* | 9/2011 | Biran et al. | 714/1 |
| 2011/0283194 A1 | 11/2011 | Chen et al. | |
| 2012/0054625 A1 | 3/2012 | Pugh et al. | |
| 2012/0159634 A1* | 6/2012 | Haikney et al. | 726/25 |
| 2012/0192181 A1* | 7/2012 | Gilbert et al. | 718/1 |
| 2013/0007738 A1* | 1/2013 | McCloy | 718/1 |
| 2013/0042003 A1* | 2/2013 | Franco et al. | 709/226 |
| 2013/0097296 A1* | 4/2013 | Gehrmann et al. | 709/223 |
| 2013/0198740 A1* | 8/2013 | Arroyo et al. | 718/1 |
| 2013/0238785 A1* | 9/2013 | Hawk et al. | 709/224 |
| 2013/0238786 A1* | 9/2013 | Khesin | 709/224 |
| 2013/0262638 A1* | 10/2013 | Kumarasamy et al. | 709/221 |

FOREIGN PATENT DOCUMENTS

WO WO 2012/032137 A1 3/2012

* cited by examiner

*Primary Examiner* — Charles Swift
(74) *Attorney, Agent, or Firm* — Stephen R. Tkacs; Stephen J. Walden, Jr.; William J. Stock

(57) ABSTRACT

A mechanism is provided for enforcing machine deployment zoning rules in an automatic provisioning system. Responsive to receiving a machine specification from a user for deployment of a virtual machine in a computing environment, the automatic provisioning system applies machine deployment zone rules to the machine specification. Responsive to the machine specification not meeting the machine deployment zone rules, the automatic provisioning system generates a failure notification. The automatic provisioning system presents the failure notification to the user.

14 Claims, 4 Drawing Sheets

ENFORCING MACHINE DEPLOYMENT ZONING RULES IN AN AUTOMATIC PROVISIONING ENVIRONMENT

BACKGROUND

The present application relates generally to an improved data processing apparatus and method and more specifically to mechanisms for enforcing machine deployment zoning rules in an automatic provisioning environment.

In some computing environments, an administrator may organize machines into zones, collections of machines, for various reasons. In an environment concerned about security, for example, there might be three different computer zones—red, yellow, and green—where the red zone allows the most secure machines and the green zone allows machines with fewer restrictions. On a global level, an administrator may zone machines by geography to enforce local rules, such as encryption regulations. The problem with managing machines over a collection of zones is that it is difficult to ensure that the machines in the zones follow the rules required by that zone. Failure to follow the rules of the zone could lead to legal or security consequences that could jeopardize a business.

The current solution to the zoning problem is a combination of human trust, process rules, and software verification throughout the process. Specifically, a human would know the rules of the zone and design a system to follow the rules. An administrator may follow a process such as peer review to ensure that the design meets the requirements of the zone. After creating the machine, the administrator may use software to attempt verification that the machine meets the requirements of the zone. The administrator may schedule the software, which attempts to ensure that a machine meets the zone requirements, to run a check every hour or day, for example, and report failures if a rule is violated. A variety of human processes and software exist to try to ensure that a machine meets the zone requirements, but each solution has drawbacks.

The problem with human reviews of possible changes to a machine in a zone are two-fold. First, a second human, the reviewer, is needed slowing down the rate at which changes can be implemented. Second, the author of the machine specification relies upon the reviewer to not make mistakes. If both the original author of a change and the reviewer forget about a security rule or chooses not to enforce a rule, then the value of the review is compromised.

A process for implementing changes is a slight variation on a classic review, where the process of making a change to a machine is a little more formal. Perhaps more people with different backgrounds all have a chance to review the change, or perhaps someone tests the change in a staging environment first. The problems with a process for implementing changes are similar, slow rate of change and possible human error.

After a machine is deployed into a zone, one may use automated software to assert that the rules are followed by the machine. For example, one may run a scan port daily to ensure that no ports are open or scan installed software packages for known security problems. When a problem is found, the software may send a report to an administrator or takes some other automated action. The main problem with this approach is the ability for a change to be "live" for some period of time before the software verification catches the rule violation.

SUMMARY

In one illustrative embodiment, a method, in a data processing system, is provided for enforcing machine deployment zoning rules in an automatic provisioning system. The method comprises responsive to receiving a machine specification from a user for deployment of a virtual machine in a computing environment, checking and enforcing, by the automatic provisioning system, machine deployment zone rules to the machine specification. The method further comprises responsive to the machine specification not meeting the machine deployment zone rules, generating, by the automatic provisioning system, a failure notification. The method further comprises presenting the failure notification to the user.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
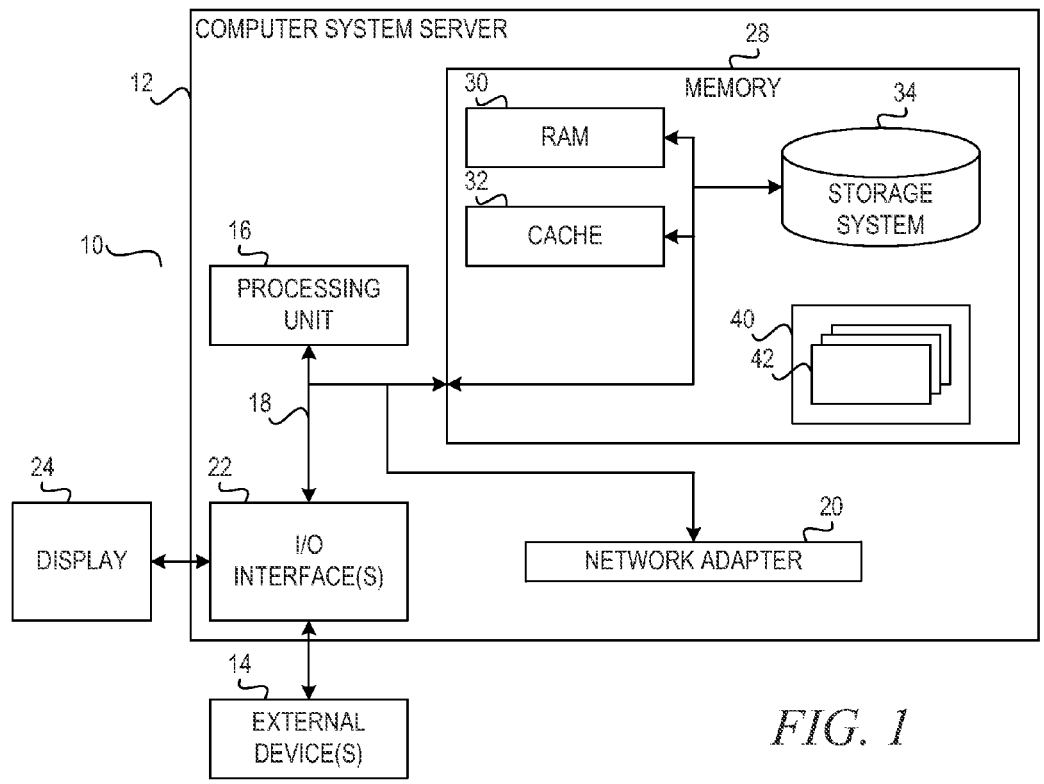
FIG. 1 depicts a cloud computing node according to an illustrative embodiment.

The illustrative embodiments provide a mechanism for leveraging the mentality of machine configuration in a source code and to enforce zoning rules before the changes are deployed to production through the use of static analysis of machine configuration. A system for automated deployment of machines would not allow a machine that breaks the zone rules to be deployed into a zone.

Because the author of a machine, or a change to a machine, declares the full machine specification in a machine readable format, the mechanism of the illustrative embodiment enforces zone rules before the machine is created and deployed. Once the rules of a zone are in place, a user can safely describe and deploy new machines that fit the rules of the zone without dependence on other people and without the time it takes to follow a more formal process. Additionally, the system that enforces zoning rules may provide feedback to the user about problems in the machine specification to speed the process of getting an approved specification designed.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises, Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
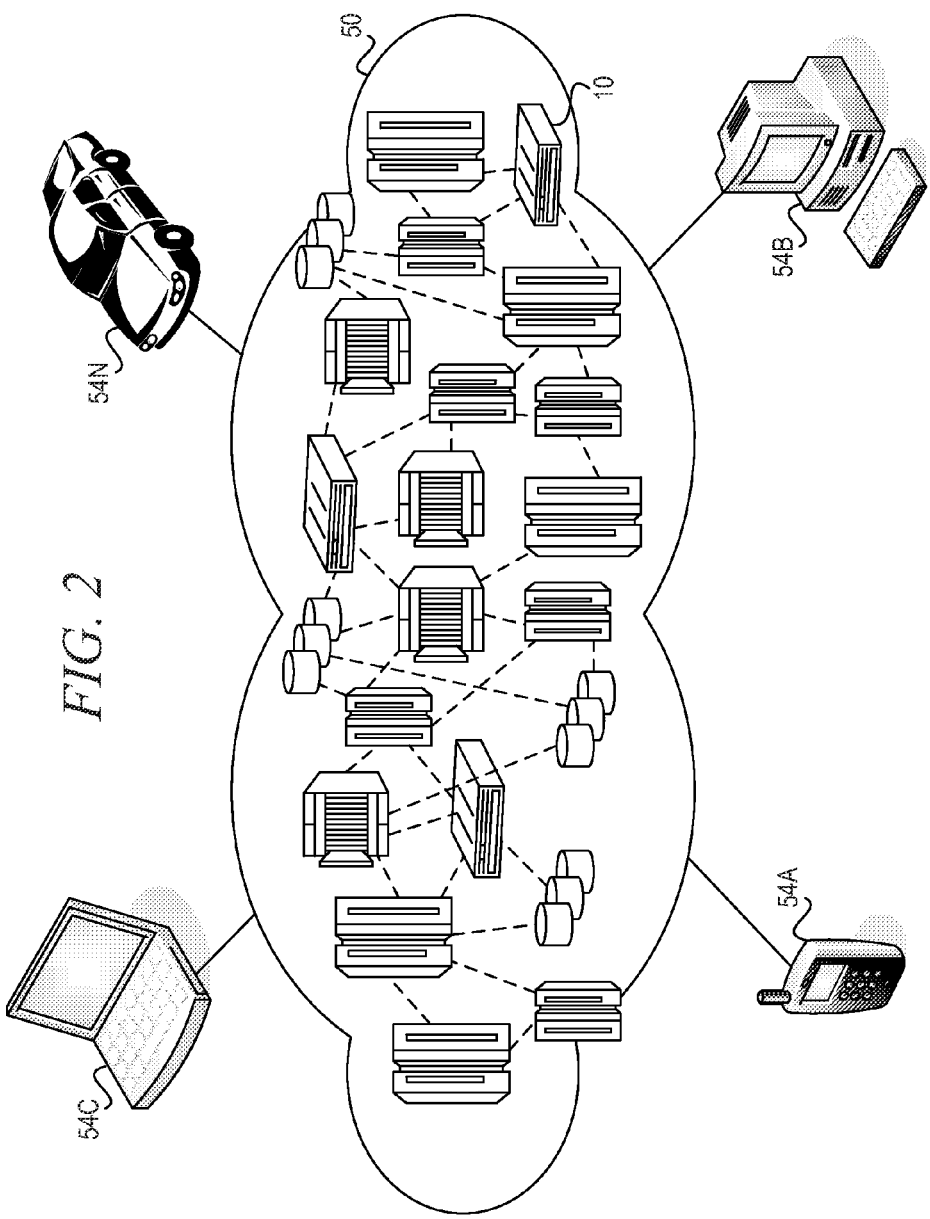
FIG. 2 depicts a cloud computing environment according an illustrative embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
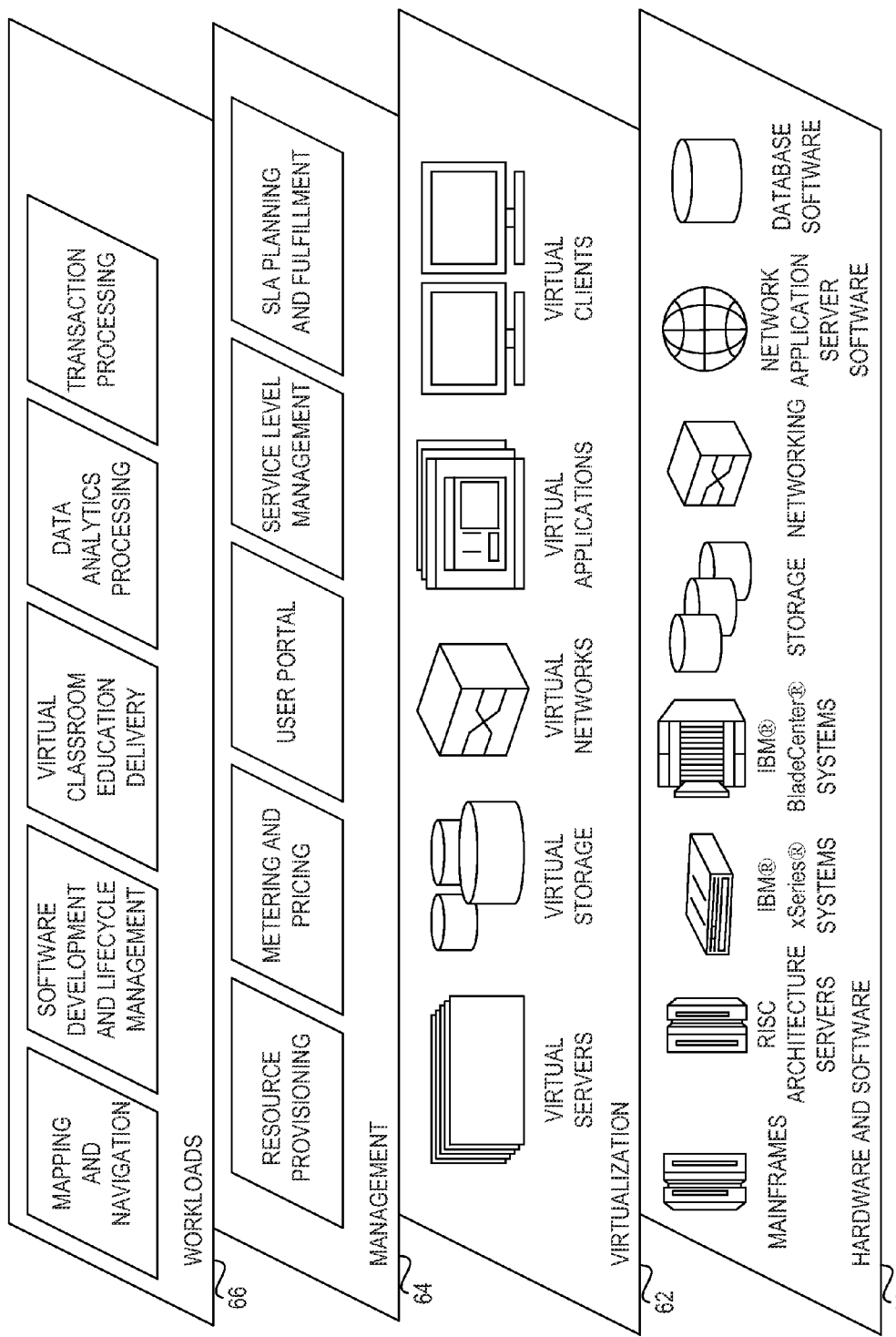
FIG. 3 depicts abstraction model layers according to an illustrative embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; and data analytics processing; transaction processing.

Figure 4:
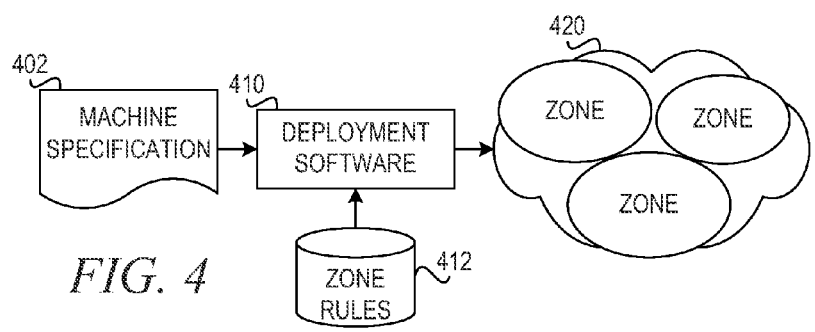
FIG. 4 is a block diagram of an automatic provisioning system for enforcing machine deployment zoning rules in an automatic provisioning environment in accordance with an illustrative embodiment.

FIG. 4 is a block diagram of an automatic provisioning system for enforcing machine deployment zoning rules in an automatic provisioning environment. Deployment software 410 receives a machine specification 402 and deploys the machine specification into cloud computing environment 420. Cloud 420 comprises a collection of machines that are managed by a system that supports automatic deployment of machines based on machine specifications, as described above. Deployment software 410 may use known cloud deployment and machine deployment scripting.

Machine specification 402 includes hardware requirements and a set of instructions to configure and install an operating system (OS) and applications. Chef is an example of a scripting language that provides instructions to install and configure applications on a provisioned machine. The machines in cloud 420 may span multiple zones where each machine is not necessarily equal. Any cloud that manages a collection of machines that spans network topologies or geographies may result in machines in multiple zones. Cloud computing environments often allow provisioning into different geographies.

Machine specification 402 includes an indication of a zone into which the machine is to be deployed. A simple augmentation of the scripting language or cloud deployment method may allow the author to specify into which zone the machine is to be deployed. Deployment software 410 analyzes machine specification 402 to determine whether machine specification 402 meets zone rules 412. If machine specification 402 satisfies zone rules 402, deployment software 410 deploys the machine in the specified zone in cloud computing environment 420.

Zone rules 412 comprise a set of rules for each zone in cloud computing environment 420. Zone rules 412 are understandable by a computer running deployment software 410. Zone rules 412 may be based on an existing rule language and modified to include rules for zone requirements that deployment software 410 can compare against machine specification 402.

Deployment software 410 reports whether machine specification 402 meets the requirements of a set of zone rules 412 for the zone into which the machine is to be deployed. If deployment software 410 determines machine specification 402 does not satisfy zone rules 412, deployment software 410 presents explanation of the failure and prompts the author to refine machine specification 402. Deployment software 410 may include a static analysis engine that examines zone rules 412 and identifies the actions in machine specification 402 that break rules within zone rules 412.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof: A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
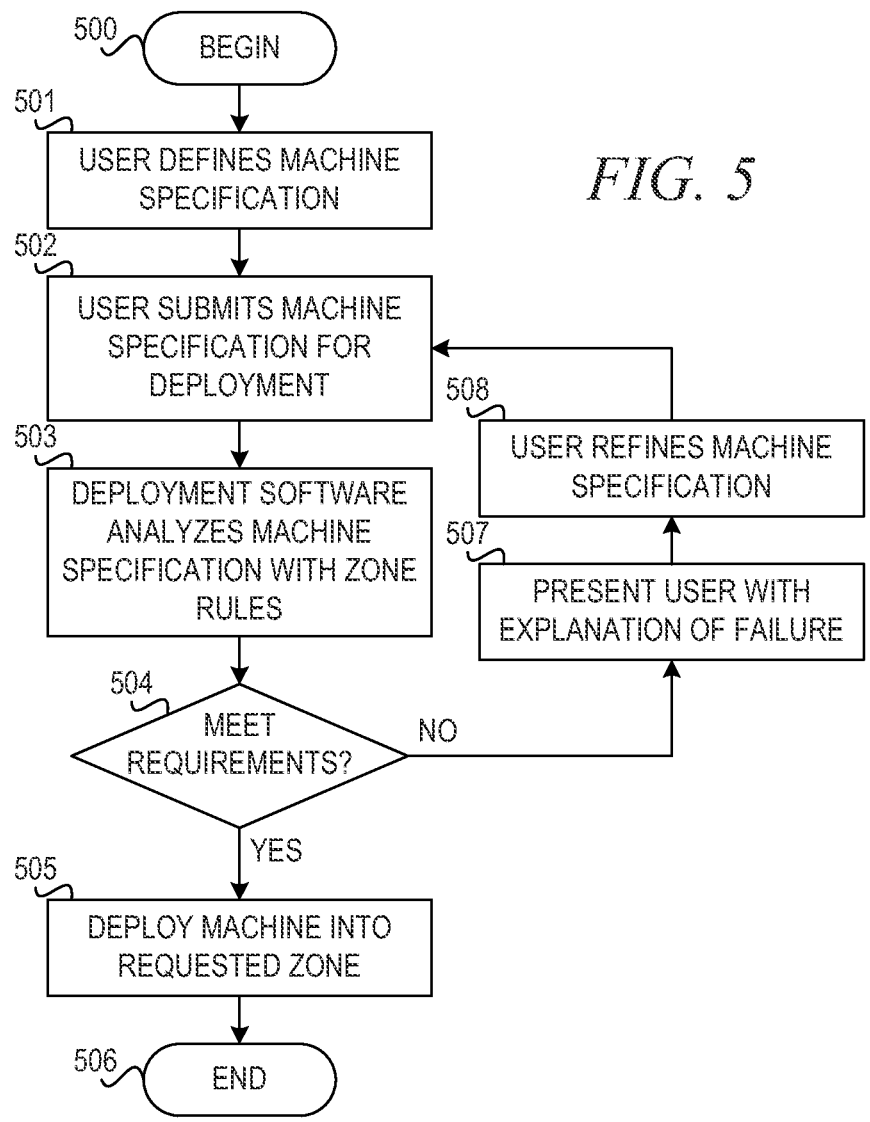
FIG. 5 is a flowchart illustrating operation of an automatic provisioning system for enforcing machine deployment zoning rules in art automatic provisioning environment in accordance with an illustrative embodiment.

FIG. 5 is a flowchart illustrating operation of an automatic provisioning system for enforcing machine deployment zoning rules in an automatic provisioning environment in accordance with an illustrative embodiment. Operation begins (block 500), and a user defines a machine specification for a machine to be deployed in a specified zone in a computing environment (block 501). The user submits the machine specification to the automatic provisioning system for deployment (block 502). The automatic provisioning system deployment software analyzes the machine specification using zone rules for a zone into which the machine is to be deployed (block 503).

The deployment software determines whether the machine specification meets the requirements of the zone rules (block 504). If the machine specification meets the requirements, the automatic provisioning system deploys the machine into the requested zone (block 505). Thereafter, operation ends.

If the deployment software determines the machine specification does not meet the requirements of the zone rules in block 504, the deployment software presents the user with explanation of the failure (block 507). The user then refines the machine specification (block 508), and operation returns to block 502 where the user submits the refined machine specification for deployment. Thus, the automatic provisioning system only deploys a machine to the requested zone in the computing environment if the machine specification meets all of the requirements of a set of zoning rules for the requested zone.

In an alternative embodiment, the user may write code for the machine specification in a code editor. The code editor may analyze the code before the machine specification is submitted to the automatic provisioning system. If the code editor determines the machine specification does not meet the requirements of the zone rules, the code editor provides feedback to the user, prompting the user to modify the code of the machine specification.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved, it will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiment provides a mechanism for leveraging the mentality of machine configuration in a source code and to enforce zoning rules before the changes are deployed to production through the use of static analysis of machine configuration. Because the author of a machine, or a change to a machine, declares the full machine specification in a machine readable format, the mechanism of the illustrative embodiments enforces zone rules before the machine is created and deployed. Once the rules of a zone are in place, a user can safely describe and deploy new machines that fit the rules of the zone without dependence on other people and without the time it takes to follow a more formal process. Additionally, the system that enforces zoning rules may provide feedback to the user about problems in the machine specification to speed the process of getting an approved specification designed.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for enforcing machine deployment zoning rules in an automatic provisioning system, the method comprising:

receiving a machine specification from a user for deployment of a virtual machine in a computing environment, wherein the computing environment comprises a plurality of zones and wherein the machine specification comprises an indication of a target zone into which the virtual machine is to be deployed;

checking and enforcing, by the automatic provisioning system, machine deployment zone rules to the machine specification, wherein the machine deployment zone rules comprise a set of zone rules for each zone in the computing environment and wherein checking and enforcing the machine deployment zone rules comprise a static analysis engine applying the set of zone rules of the target zone and determining whether one or more actions in the machine specification violate the set of rules of the target zone;

responsive to determining the one or more actions in the machine specification violate the set of zone rules of the target zone, generating, by the automatic provisioning system, a failure notification and presenting the failure notification to the user, and responsive to determining the one or more actions in the machine specification do not violate the set of zone rules of the target zone, automatically deploying the virtual machine in the target in the computing environment.

2. The method of claim 1, further comprising:

responsive to receiving a refined machine specification from the user for deployment of the virtual machine in the cloud computing environment, checking and enforcing the machine deployment zone rules to the refined machine specification.

3. The method of claim 1, wherein chine specification is written in a machine deployment scripting language.

4. The method of claim 1, wherein the machine specification comprises hardware requirements and a set of instructions to configure and install an operating system and one or more applications.

5. A computer program product comprising a computer readable storage memory having a computer readable program stored therein, wherein the computer readable program, when executed on a computing device, causes the computing device to;

receive a machine specification from a user for deployment of a virtual machine in a computing environment, wherein the computing environment comprises a plurality of zones and wherein the machine specification comprises an indication of a target zone into which the virtual machine is to be deployed;

check and enforce machine deployment zone rules to the machine specification, wherein the machine deployment zone rules comprise a set of zone rules for each zone in the computing environment and wherein checking and enforcing the machine deployment zone rules comprise a static analysis engine applying the set of zone rules of the target zone and determining whether one or more actions in the machine specification violate the set of rules of the target zone;

responsive to determining the one or more actions in the machine specification violate the set of zone rules of the target zone, generate a failure notification and present the failure notification to the user; and responsive to determining the one or more actions in the machine specification do not violate the set of zone rules of the target zone, automatically deploy the virtual machine in the target zone in the computing environment.

6. The computer program product of claim 5, wherein the computer readable program further causes the computing device to:

responsive to receiving a refined machine specification from the user for deployment of the virtual machine in the computing environment, check and enforce the machine deployment zone rules to the refined machine specification.

7. The computer program product of claim 5, wherein the machine specification is written in a machine deployment scripting language.

8. The computer program product of claim 5, wherein the machine specification comprises hardware requirements and a set of instructions to configure and install an operating system and one or more applications.

9. The computer program product of claim 5, wherein the computer readable program is stored in a computer readable storage medium in a data processing system and wherein the computer readable program was downloaded over a network from a remote data processing system.

10. The computer program product of claim 5, wherein the computer readable program is stored in a computer readable storage medium in a server data processing system and wherein the computer readable program is downloaded over a network to a remote data processing system for use in a computer readable storage medium with the remote system.

11. An apparatus, comprising:

a processor; and a memory coupled to the processor, wherein the memory comprises instructions which, when executed by the processor, cause the processor to;

receive a machine specification from a user for deployment of a virtual machine in a computing environment, wherein the computing environment comprises a plurality of zones and wherein the machine specification comprises an indication of a target zone into which the virtual machine is to be deployed;

check and enforce machine deployment zone rules to the machine specification, wherein the machine deployment zone rules comprise a set of zone rules for each zone in the computing environment and wherein checking and enforcing the machine deployment zone rules comprise a static analysis engine applying the set of zone rules of the target zone and determining whether one or more actions in the machine specification violate the set of rules of the target zone;

responsive to determining the one or more actions in the machine specification violate the set of zone rules of the target zone, generate a failure notification and present the failure notification to the user; and responsive to determining the one or more actions in the machine specification do not violate the set of zone rules of the target zone, automatically deploy the virtual machine in the target zone in the computing environment.

12. The apparatus of claim 11, wherein the instructions further cause the processor to;

responsive to receiving a refined machine specification from the user for deployment of the virtual machine in the computing environment, check and enforce the machine deployment zone rules to the refined machine specification.

13. The apparatus of claim 11, wherein the machine specification comprises hardware requirements and a set of instructions to configure and install an operating system and one or more applications.

14. The apparatus of claim 11, wherein the machine specification is written in a machine deployment scripting language.

\* \* \* \* \*